United States Patent
Kamuf et al.

(10) Patent No.: US 10,205,561 B2
(45) Date of Patent: Feb. 12, 2019

(54) METHOD AND ARRANGEMENT OF PROCESSING A PACKET OF A HARQ SYSTEM

(75) Inventors: Matthias Kamuf, Lund (SE); Bo Lincoln, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1892 days.

(21) Appl. No.: 13/382,560

(22) PCT Filed: Jul. 5, 2010

(86) PCT No.: PCT/EP2010/059517
§ 371 (c)(1),
(2), (4) Date: Aug. 14, 2012

(87) PCT Pub. No.: WO2011/003842
PCT Pub. Date: Jan. 13, 2011

(65) Prior Publication Data
US 2012/0300699 A1  Nov. 29, 2012

Related U.S. Application Data (60) Provisional application No. 61/224,580, filed on Jul. 10, 2009.

(30) Foreign Application Priority Data

Jul. 8, 2009  (EP) .................................... 09164942

(51) Int. Cl.
*H04L 1/18*  (2006.01)
(52) U.S. Cl.
CPC .......... *H04L 1/1845* (2013.01); *H04L 1/1812* (2013.01)

(58) Field of Classification Search
CPC ... H04L 1/1845; H04L 1/0066; H04L 1/1812; H04L 2209/34; H04W 88/08
See application file for complete search history.

(56) References Cited

U.S. PATENT DOCUMENTS 6,819,630 B1 * 11/2004 Blackmon et al. .......... 367/134
7,372,837 B2   5/2008 Kinjo et al.
(Continued)

FOREIGN PATENT DOCUMENTS

| CN | 1493129 A | 4/2004 |
|---|---|---|
| CN | 101222307 A | 7/2008 |
| WO | 2008056031 A1 | 5/2008 |

OTHER PUBLICATIONS

Raitola, M. et al., "Wideband CDMA Packet Data with Hybrid ARQ", IEEE International Symposium on Spread Spectrum Techniques & Applications, Sep. 4, 1998, pp. 318-322.
(Continued)

*Primary Examiner* — Raj Jain
(74) *Attorney, Agent, or Firm* — Rothwell, Figg, Ernst & Manbeck, p.c.

(57) ABSTRACT

A method for an electronic receiver of processing a packet of a hybrid automatic repeat request (HARQ) system is disclosed. The method comprises receiving a first transmission of the packet, wherein the first transmission comprises a first plurality of soft symbol values and determining whether the first plurality of soft symbol values meets a stop criterion. If it is determined that the first plurality of soft symbol values does not meet the stop criterion, a subject of the first plurality of soft symbol values is determined, wherein the subset comprises a number of soft symbol values of the first plurality of soft symbol values, the number being greater than zero and less than the first plurality. The subset of the first plurality of soft symbol values is stored in a HARQ buffer. A second plurality of soft symbol values,
(Continued)

comprised in a second transmission of the packet received by the electronic receiver, is combined with the stored subset of the first plurality of soft symbol values to produce a third plurality of combined soft symbol values. Corresponding arrangement, receiver, device, and computer program product are also disclosed.

22 Claims, 3 Drawing Sheets

(56) References Cited

U.S. PATENT DOCUMENTS

| | | | |
|---|---|---|---|
| 2002/0075841 | A1 | 6/2002 | Steer et al. |
| 2003/0103585 | A1 | 6/2003 | Kim et al. |
| 2003/0167433 | A1* | 9/2003 | Wengerter et al. ........... 714/749 |
| 2005/0220024 | A1 | 10/2005 | Agin et al. |
| 2007/0106924 | A1 | 5/2007 | Seidel et al. |
| 2008/0065944 | A1 | 3/2008 | Seol et al. |
| 2008/0282125 | A1* | 11/2008 | Hafeez et al. ................ 714/748 |
| 2009/0086657 | A1 | 4/2009 | Alpert et al. |
| 2009/0135965 | A1* | 5/2009 | Shen et al. .................... 375/341 |
| 2009/0158109 | A1 | 6/2009 | Park et al. |
| 2009/0158110 | A1 | 6/2009 | Park et al. |
| 2011/0041041 | A1* | 2/2011 | Kim .............................. 714/780 |

OTHER PUBLICATIONS

Office Action dated Dec. 17, 2013 in corresponding Chinese Application No. 201080031399.X, 14 pages (English translation only).
Office Action dated Sep. 29, 2014 in corresponding Chinese Application No. 201080031399.X, 8 pages (English translation only).
Bai, et al., "Turbo Coded Type-II H-ARQ Scheme with Incremental Redundancy Using Sub-Block Recovery", Global Telecommunications Conference, Nov. 1, 2006, pp. 1-5, XP031075879.
Motorola, "Revised: Hybrid-ARQ Scheme Using Incremental Redundancy", 3rd Generation Partnership Project (3GPP), TSG-RAN1 #22, Nov. 19-23, 2001, pp. 1-13, XP050095469.
Wen, et al., "On the Performance of Incremental Redundancy Hybrid ARQ Schemes with Rate Compatible LDPC Codes", Communications, Circuits and Systems Proceedings, Jun. 1, 2006, pp. 731-734, XP031010535.
International Preliminary Report on Patentability, issued in PCT/EP2010/059517 dated Jan. 10, 2012, 7 pages.
Search Report issued in Chinese application No. 201080031399.X dated Sep. 23, 2014, 2 pages.
International Search Report and Written Opinion in PCT/EP2010/059517 dated Aug. 3, 2010, 12 pages.
Communication and European Search Report in EP 09164942.6 dated Jan. 21, 2010, 9 pages.
Raitola, M., et. al., "Wideband CDMA Packet Data with Hybrid ARQ," Proceeding of the IEEE Symposium on Spread Spectrum Techniques and Applications (ISSSTA'98), Sep. 1998, pp. 318-322 (5 pages).

* cited by examiner

METHOD AND ARRANGEMENT OF PROCESSING A PACKET OF A HARQ SYSTEM

CROSS REFERENCE TO RELATED APPLICATION(S)

This application is a 35 U.S.C. § 371 National Phase Entry Application from PCT/EP2010/059517, filed Jul. 5, 2010, designating the United States and claiming priority to European Application 09164942.6 filed Jul. 8, 2009 and U.S. Application 61/224,580 filed Jul. 10, 2009. Each of the above identified applications are incorporated by reference herein in their entirety.

TECHNICAL FIELD

The present invention relates generally to the field of HARQ (Hybrid Automatic Repeat reQuest) processing. More particularly, it relates to optimization of HARQ buffer size.

BACKGROUND

Many communication systems include HARQ retransmission functionality (often combined with a demodulation and decoding scheme) which is well known in the art.

For example, HARQ functionality may be applied in a system where link adaptation aims to settle the BLER (block error rate) of a transmission at a certain operating point. If, for example, the BLER operating point is 10% BLER (as is often the case in cellular systems) the 10% of the packets received at the initial transmission of a packet fail to be decoded and 90% of the packets are successfully decoded. This indicates that many of the packets that failed decoding are probably still relatively close to be decodable, and the information that was received in the initial transmission of a failed packet may still be worth using. This is utilized by the HARQ system, in which this information is stored (as soft bit values) and a retransmission of the packet is requested. A retransmission of a packet may, for example, comprise the same information as in the previous transmission or it may comprise different or additional information. When the retransmitted packet arrives, it is combined with the stored information and a new decoding attempt is made. In an exemplary HARQ system, this process is iterated until the packet is successfully decoded or until a maximum number of retransmissions have occurred. A HARQ system may provide robustness against inaccuracies and/or delays in the link adaptation algorithm. A HARQ system may provide a basis for efficient low-latency communication, one reason being that only the physical layer (which generally has faster response times than higher layers) is involved in the HARQ protocol.

HARQ schemes are designed to improve receiver performance and to optimize utilization of channel capacity. However, a drawback with HARQ-systems is that a receiver supporting HARQ has to be able to store soft bit values while waiting for a retransmission.

In many HARQ systems, there is a requirement that a receiver should be able to store packets of a particular size (e.g. relating to a transport format in UMTS—Universal Mobile Telecommunication Standard—or in UMTS LTE—Long Term Evolution). In some HARQ systems there may be a requirement regarding the resolution for each stored soft bit value. Furthermore, some HARQ systems may have requirements that a receiver should be able to support a particular number of simultaneous HARQ process. Such and other requirements may lead to that the memory space that need to be reserved for HARQ-processing (e.g. a HARQ buffer) may be quite extensive and may, for example, severely affect the size of hardware implementations. This may be particularly problematic at the terminal side of a communication system, since a terminal often has stringent area and power consumption requirements. Thus, physical implementation of HARQ buffers may be problematic.

This may be particularly pronounced in systems with high throughput and relatively long latency (e.g. UMTS LTE), where the HARQ buffer size may need to be very large compared to the size occupied by other functionalities of a baseband system. UMTS LTE generally support large information block sizes, leading to even larger packets to transmit since the information block is generally encoded by an error correcting code introducing redundancy symbols (often a multiple of the information block size) before transmission, which additionally increases the required HARQ buffer size.

In UMTS LTE as well as in UMTS (HSPA—High Speed Packet Access), methods have been introduced to limit the HARQ buffer size. In UMTS LTE, the concept is referred to as Limited-buffer Rate Matching, and in HSPA it is denoted Two-stage Rate Matching. These concepts were introduced at the expense of an increased effective code rate. However, even with these standardized methods, the size of the HARQ buffers is still a big contributor to the overall chip size (in particular for UMTS LTE, independently of the UE category).

Therefore, there is a need for methods and arrangements that lowers the required HARQ buffer size.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of the invention to obviate at least some of the above disadvantages and to provide methods and arrangements that lowers the required HARQ buffer size.

According to a first aspect of the invention this is achieved by a method for an electronic receiver of processing a packet of a hybrid automatic repeat request (HARQ) system. The method comprises receiving a first transmission of the packet, wherein the first transmission comprises a first plurality of soft symbol values, and determining whether the first plurality of soft symbol values meets a stop criterion. The method further comprises—if it is determined that the first plurality of soft symbol values does not meet the stop criterion—determining a subset of the first plurality of soft symbol values, wherein the subset comprises a number of soft symbol values of the first plurality of soft symbol values, the number being greater than zero and less than the first plurality, storing the subset of the first plurality of soft symbol values in a HARQ buffer, receiving a second transmission of the packet, wherein the second transmission comprises a second plurality of soft symbol values, and combining the second plurality of soft symbol values with the stored subset of the first plurality of soft symbol values to produce a third plurality of combined soft symbol values.

The first transmission may be an initial transmission of the packet and the second transmission may be a re-transmission of the packet. Alternatively or additionally, the first transmission may be a first re-transmission of the packet and the second transmission may be a second re-transmission of the packet.

In some embodiments, where the packet has been encoded by a first error correcting code and a first error detecting code in relation to the first transmission of the packet, the method may further comprise decoding the packet based on the first error correcting code and the first plurality of soft symbol values after the step of receiving the first transmission of the packet. In such embodiments, the step of determining whether the first plurality of soft symbol values meets a stop criterion may comprise determining whether the step of decoding the packet based on the first plurality of soft symbol values was successful based on the first error detecting code, whereby it is determined that the first plurality of soft symbol values does not meet the stop criterion if it is determined that the step of decoding the packet based on the first plurality of soft symbol values was not successful.

The error correcting code may be a systematic error correcting code and the subset of the first plurality of soft symbol values may comprise or consist of all soft symbol values corresponding to systematic symbols of the systematic error correcting code according to some embodiments of the invention. The error detecting code may comprise a check sum. Storing only the soft symbol values corresponding to systematic symbols may have the advantage that no or very little processing overhead is required compared to when the subset comprises other soft symbol values.

In some embodiments, the step of combining the second plurality of soft symbol values with the stored subset of the first plurality of soft symbol values may comprise substituting soft symbol values belonging to the first plurality of soft symbol values and not belonging to the subset of the first plurality of soft symbol values with a soft symbol value corresponding to a log likelihood ratio of zero, and combining the second plurality of soft symbol values with the stored subset of the first plurality of soft symbol values and the substituted soft symbol values corresponding to a log likelihood ratio of zero to produce the third plurality of combined soft symbol values.

The step of determining the subset of the first plurality of soft symbol values may, in some embodiments, be performed dynamically at moments in time corresponding to one or more of: a first transmission of each of a plurality of packets of the HARQ system, a retransmission of each of the plurality of packets of the HARQ system, regular time intervals, a change of packet transmission format, and a change in system bandwidth.

In some embodiments, the determination of the subset of the first plurality of soft symbol values may be based on one or more of: a target signal-to-noise ratio operating point, a target block error rate operating point, an available HARQ buffer size, a current memory fill status, a current system bandwidth, a current packet transmission mode, and a maximum possible system bit rate.

The method may further comprise determining whether the third plurality of soft symbol values meets the stop criterion, and—if it is determined that the third plurality of soft symbol values does not meet the stop criterion— determining a second subset of the third plurality of combined soft symbol values, wherein the second subset comprises a second number of soft symbol values of the third plurality of combined soft symbol values, the second number being greater than zero and less than the third plurality, storing the second subset of the third plurality of combined soft symbol values in the HARQ buffer, receiving a third transmission of the packet, wherein the third transmission comprises a fourth plurality of soft symbol values, and combining the fourth plurality of soft symbol values with the stored second subset of the third plurality of combined soft symbol values to produce a fifth plurality of combined soft symbol values.

A second aspect of the invention is a computer program product comprising a computer readable medium, having thereon a computer program comprising program instructions, the computer program being loadable into a data-processing unit of an electronic receiver and adapted to cause the data-processing unit to execute at least the following steps for processing of a packet of a HARQ system, when the computer program is run by the data-processing unit: determining whether a plurality of soft symbol values, comprised in a first transmission of the packet received by the electronic receiver, meets a stop criterion, and—if it is determined that the first plurality of soft symbol values does not meet the stop criterion—determining a subset of the first plurality of soft symbol values, wherein the subset comprises a number of soft symbol values of the first plurality of soft symbol values, the number being greater than zero and less than the first plurality, storing the subset of the first plurality of soft symbol values in a HARQ buffer, and combining a second plurality of soft symbol values, comprised in a second transmission of the packet received by the electronic receiver, with the stored subset of the first plurality of soft symbol values to produce a third plurality of combined soft symbol values.

A third aspect of the invention is an arrangement for an electronic receiver, adapted to process a packet of a HARQ system. The arrangement comprises a determination unit, a combiner, a memory unit, and a HARQ buffer control unit. The determination unit is adapted to determine whether a plurality of soft symbol values, comprised in a first transmission of the packet received by the electronic receiver, meets a stop criterion. The HARQ buffer control unit is adapted to determine a subset of the first plurality of soft symbol values in response to a determination by the determination unit that the first plurality of soft symbol values does not meet the stop criterion, wherein the subset comprises a number of soft symbol values of the first plurality of soft symbol values, the number being greater than zero and less than the first plurality. The memory unit is adapted to store the subset of the first plurality of soft symbol values in a HARQ buffer. The combiner is adapted to combine a second plurality of soft symbol values, comprised in a second transmission of the packet received by the electronic receiver, with the stored subset of the first plurality of soft symbol values to produce a third plurality of combined soft symbol values.

In some embodiments, where the packet has been encoded by a first error correcting code and a first error detecting code in relation to the first transmission of the packet, the arrangement may further comprise a decoder adapted to decode the packet based on the first error correcting code and the first plurality of soft symbol values, and determine whether decoding the packet based on the first plurality of soft symbol values was successful based on the first error detecting code, whereby it is determined that the first plurality of soft symbol values does not meet the stop criterion if it is determined that decoding the packet based on the first plurality of soft symbol values was not successful.

In some embodiments, the arrangement may further comprise a receiving unit adapted to receive the first and second transmissions of the packet.

The packet may be comprised in at least one of: a Wideband Code Division Multiple Access (WCDMA) signal, and an Orthogonal Frequency Division Multiplexing (OFDM) signal.

A fourth aspect of the invention is an electronic receiver comprising an arrangement according to the third aspect.

A fifth aspect of the invention is a communication device comprising a receiver according to the fourth aspect. In some embodiments, the communication device may be compliant with at least one of: a Universal Mobile Telecommunication Standard (UMTS) standard and an UMTS Long Term Evolution (UMTS LTE) standard.

It is emphasized that embodiments of the invention are equally applicable in relation to any communication standard involving HARQ, such as UMTS, UMTS LTE, and WiMAX.

In some embodiments, the second, third, fourth and fifth aspects of the invention may additionally have features identical with or corresponding to any of the various features as explained above for the first aspect of the invention.

An advantage of some embodiments of the invention is that the amount of memory required for the HARQ buffer may be reduced.

Another advantage of some embodiments of the invention is that the memory reduction may be achieved at no or little loss in terms of performance (e.g. throughput, bit or block error rate, etc).

Another advantage of some embodiments of the invention is that the implementation and/or production cost may be reduced for devices that comprise embodiments of the invention.

Another advantage of some embodiments of the invention is that the amount of stored data for each packet may be varied dynamically.

Another advantage of some embodiments of the invention is that different classes of terminals may be differentiated (e.g. in terms of performance) via exploitation of the dynamic behavior of embodiments of the invention. For example, in UMTS LTE a high category UE (user equipment) may have to support all (or many) transport formats (i.e. also the ones with relatively long blocks) while a low category UE may have to support only the transport formats with relatively short blocks. Using embodiments of the invention (e.g. letting the high category UE store a lower amount of soft bit values on the average), both categories of UE may be built from the same platform, having the same memory size available for HARQ buffering.

Another advantage of some embodiments of the invention is that a control mechanism to meet a target operating point (e.g. in terms of BLER performance) is provided.

BRIEF DESCRIPTION OF THE DRAWINGS

Further objects, features and advantages of the invention will appear from the following detailed description of embodiments of the invention, with reference being made to the accompanying drawings, in which.

DETAILED DESCRIPTION

In the following, embodiments of the invention will be described where only a subset of the available soft bit values is stored in the HARQ buffer. This effectively reduces the amount of memory needed for the HARQ buffer. We will refer in this description to soft bit values. It is to be understood, however, that embodiments of the invention are equally applicable for any soft symbol values.

Storing of only a subset of the soft bit values may be applied if the initial transmission of a packet does not pass a stop criterion and a first retransmission is requested. Storing of only a subset of the soft bit values may also be applied if any retransmission of the packet does not pass the stop criterion and another retransmission is requested. In some embodiments, all the available soft bit values are stored if the initial transmission of a packet does not pass a stop criterion and storing of only a subset of the soft bit values is applied only if a retransmission of the packet does not pass the stop criterion. Other variations may also be easily envisioned.

In some embodiments it is determined dynamically whether to store all the available soft bit values or only a subset thereof. The dynamic determination may, for example, be based on one or more of: a target signal-to-noise ratio operating point, a target block error rate operating point, an available HARQ buffer size, a current memory fill status, a current system bandwidth, a current packet transmission mode, and a maximum possible system bit rate.

The subset size (i.e. how many soft bit values that should be included in the subset) may also be dynamically determined, e.g. based on one or more of: a target signal-to-noise ratio operating point, a target block error rate operating point, an available HARQ buffer size, a current memory fill status, a current system bandwidth, a current packet transmission mode, and a maximum possible system bit rate.

For example, the fill status of the HARQ buffer may be monitored and if the fill status is above a memory fill threshold it may be determined to store only a subset of the soft bit values, while all soft bit values may be stored if the fill status is below the memory fill threshold. Solutions with several thresholds and corresponding different subset sizes may also be envisioned.

Another example may be that only a subset of the soft bit values is stored if the current transmission mode defines a relatively large packet size, while all soft bit values may be stored if the current transmission mode defines a relatively small packet size. Also in this case, solutions with several thresholds and corresponding different subset sizes may be envisioned.

Yet another example may be, in a system with no, poor, or slow link adaptation, to store all soft bit values if the error rate is above an error rate threshold (operating point) to make sure that there is no performance loss due to partial storing, and to store only a subset if the error rate is below the error rate threshold. In some embodiments, the size of the subset may be related to the error rate (e.g. in a continuous or step-wise manner).

Any combinations of the above and other examples are equally applicable. For example, some embodiments may consider storing only a subset if the fill status is above a memory fill threshold or the current transmission mode defines a relatively large packet size, while some embodiments may consider storing only a subset only when the fill status is above a memory fill threshold and the current transmission mode defines a relatively large packet size.

In an example UMTS LTE UE, where scalability requirements typically force the memory size to be determined by a worst case scenario (e.g. 20 MHz system bandwidth), there is usually a lot of available memory when the UE is operating with a smaller system bandwidth. For such UE:s, embodiments of the invention provide a way to decrease the maximum required memory size (by only storing a subset of soft bit values in large system bandwidth operation) while still keeping full performance in smaller system bandwidth operation (by storing all soft bit values).

Thus, embodiments of the invention store only a subset of the available soft bit values in the HARQ buffer. A determination of whether to store all soft bits or only a subset and/or a determination of the subset size may be based on any suitable requirement, e.g. a requirement that drives the implementation (performance, memory size, etc).

Figure 1A:
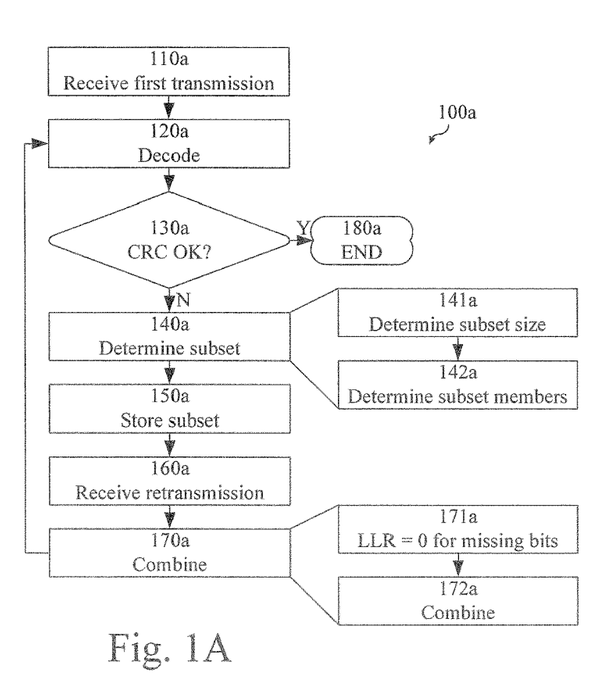
FIGS. 1A and 1B are flowcharts illustrating example method steps according to some embodiments of the invention.

FIG. 1A is a flowchart illustrating an example method 100a according to some embodiments of the invention. In step 110a, a first transmission of a packet of a HARQ system is received. The first transmission may, for example, be an initial transmission of the packet according to the HARQ scheme. Alternatively, the first transmission may be any retransmission of the packet according to the HARQ scheme. The received first transmission of the packet comprises a number of soft bit values. The number of soft bit values depends on the payload of the packet, the code rate of any error correcting code, the code rate of any error detecting code, the puncturing (rate matching) scheme if there is one, the size of possible packet overhead, etc.

In step 120a, the packet is decoded based on the soft bit values and based on the error correcting code according to any suitable decoding method. In step 130a, it is determined whether or not the decoding in step 120a was successful. This determination may be based on an error detecting code (e.g. a check sum such as a CRC—cyclic redundancy check—as illustrated in step 130a). Alternatively, the determination may be based on any means to determine whether or not the decoding was successful. For example, a probability value (e.g. a Euclidean distance value, a log-likelihood ratio, a convergence value, or similar) may be computed for each decoded symbol or a joint probability value (e.g. a statistical variance value, an average value, or similar) may be determined for the decoded packet, and tested against some criteria. For example, it may be determined that the decoding was successful if a minimum number of decoded symbols have a probability value that is higher than a probability threshold.

If it is determined that the decoding in step 120a was successful (YES-path out of step 130a) then the HARQ process ends in step 180a.

If it is determined that the decoding in step 120a was not successful (NO-path out of step 130a) then the process continues to step 140a, where a subset of the available soft bit values are selected.

In some embodiments, step 140a may comprise first determining the size of the subset (i.e. the number K of soft bit values to be stored) in sub-step 141a, and then determining which K soft bit values to include in the subset in sub-step 142a.

In other embodiments, there may be no degrees of freedom regarding which K soft bit values to include in the subset, in which case sub-step 142a is left out. An example of such an embodiments may be where it is predetermined that e.g. the K first (or last or any other set of consecutive) soft values are to be stored. Such an approach has the advantage that no or very little memory space has to be reserved for storing patterns or addresses relating to which soft bit values are stored.

In some embodiments, the value K may be predetermined (e.g. the subset always comprising ⅓ of the soft bit values), in which case sub-step 141a is left out.

In some embodiments, both of the sub-steps 141a and 142a are left out (e.g. if it is predetermined that the subset should always comprise ⅓ of the soft bit values, namely those corresponding to the systematic bits of a rate ⅓ systematic code). In the latter case, step 140a simply comprises selecting the soft bit values to store according to the predetermined rule.

In step 150a, the selected subset of soft bit values are stored in the HARQ buffer (e.g. by first reserving HARQ memory for the subset size and then storing the soft bit values of the subset), and in step 160a a retransmission of the packet is received in accordance to the HARQ scheme. The HARQ scheme and corresponding soft combining scheme determines which symbols are included in the retransmission as compared with the first transmission. It may be the same symbols, or they may differ. If they differ, there may be fewer, the same amount, or more symbols in the retransmission than in the first transmission. Some symbols that where included in the first transmission may also be included in the retransmission, while other symbols may be excluded. Some symbols that where not included in the first transmission (e.g. due to puncturing) may be included in the retransmission.

In step 170a, the stored soft bit values of the subset determined in step 140a are combined with the soft bit values received in step 160a to produce a set of combined soft bit values.

In the combination, any soft combining method may be used. For example, two soft bit values corresponding to the same information bit may be combined using an average function or a weighted average function. Soft bit values that were included in the first transmission of the packet, but not stored in step 150a may be replaced by a soft bit value that has no information content (e.g. a value that correspond to a log-likelihood ratio of zero) in sub-step 171a before combination with the soft bit values of the retransmission in sub-step 172a.

Then, the process returns to step 120a (in some embodiments after releasing the HARQ memory that is no longer used) and a new decoding attempt is made based on the combined soft bit values. The iteration continues until step 180a is reached, or (in some embodiments) until a maximum number of iterations (corresponding to a maximum number of retransmissions) have been performed.

The second iteration and onwards, embodiments of the invention may preferably store (subsets of) combined soft bit values. However, some embodiments of the invention may store (subsets of) soft values for each transmission/retransmission, and adapt the combining accordingly. This, however, requires more memory and is therefore not preferable.

Figure 1B:
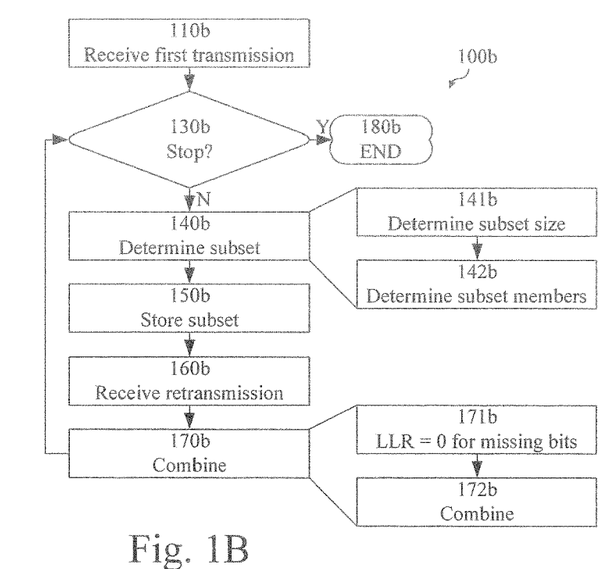

FIG. 1B is a flowchart illustrating an example method 100b according to some embodiments of the invention. The steps 110b, 140b (141b, 142b), 150b, 160b, 170b (171b, 172b) and 180b are similar to steps 110a, 140a (141a, 142a), 150a, 160a, 170a (171a, 172a) and 180a and will not be elaborated on further.

In the example method 100b, there is no decoding step (e.g. if the packet is sent un-coded, if all but the systematic bits are punctured in the rate matching, etc).

In step 130b, it is determined whether or not the soft bit values received in step 110b meets a stop criterion. The determination may be based on any suitable stop criteria. For example, a probability value (e.g. a Euclidean distance value, a log-likelihood ratio, a convergence value, or similar) may be computed for each soft bit value (in fact the soft bit value itself corresponds to a probability value). Alternatively or additionally a joint probability value (e.g. a statistical variance value, an average value, or similar) may be determined for the received packet. One or more of such probability values may be tested against the stopping criteria to determine how to proceed. For example, it may be determined that the stopping criterion is met if an average (over the soft bit values of the packet) minimum Euclidean distance to a symbol value is below a distance threshold. In some embodiments, it may be determined that the stopping criterion is met if a minimum number of soft bit values have a corresponding probability value that is higher than a probability threshold.

After combining in step 170b, the process returns to step 130b where it is determined whether the combined set of soft bit values meets the stopping criterion. The iteration continues until step 180b is reached, or (in some embodiments) until a maximum number of iterations (corresponding to a maximum number of retransmissions) have been performed.

Figure 2A:
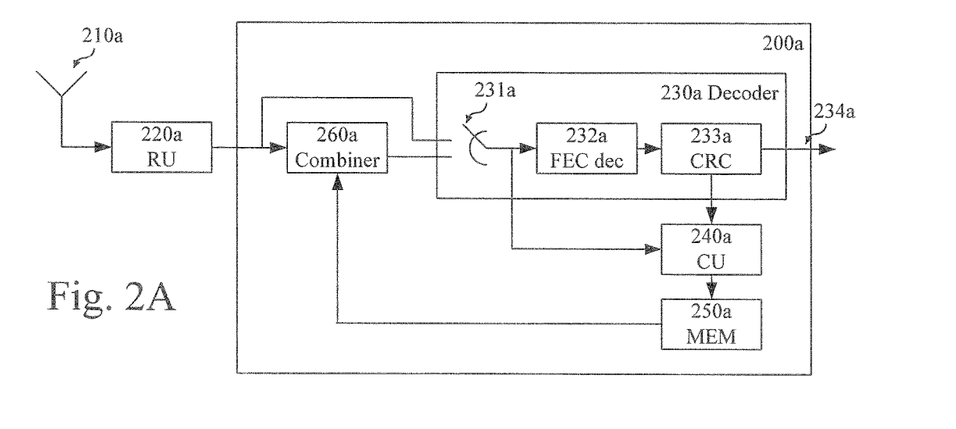
FIGS. 2A and 2B are block diagrams illustrating example arrangements according to some embodiments of the invention.

FIG. 2A illustrates an example arrangement 200a according to some embodiments of the invention. The arrangement 200a comprises a combiner 260a, a decoder 230a (which in turn comprises a switch 231a, a forward error correcting decoder (FEC dec) 232a, and a cyclic redundancy check unit (CRC) 233a), a control unit (CU) 240a, and a memory (MEM) 250a. The arrangement 200a may, for example, be adapted to perform method steps as described in connection to FIG. 1A.

In FIG. 2A, the arrangement 200a is illustrated as incorporated into a receiver chain. The receiver chain comprises one or more antennas 210a and a receiving unit (RU) 220a, which may, for example, comprise conventional receiver front end circuitry. The receiving unit outputs a signal (e.g. a baseband signal), which is received by the arrangement 200a.

If the signal received by the arrangement 200a is an initial transmission of a packet of a HARQ scheme, the switch 231a is set to its upper position and the received signal is directly input to the FEC decoder 232a, where an attempt to decode the packet is made (compare with step 120a in FIG. 1A). The presumably decoded signal output from the FEC decoder 232a is then input to the CRC unit 233a, where it is determined whether or not the FEC decoding was successful (compare with step 130a in FIG. 1A). If the decoding was successful, the decoded signal is output from the arrangement at 234a and possibly subjected to further processing.

However, if the decoding was not successful, the control unit 240a is activated by a control signal. The control signal may, for example, be generated by the CRC unit 233a as illustrated in FIG. 2A. When activated, the control unit is adapted to control the storing of soft bit values in the HARQ buffer of the memory 250a. For example, the control unit 240a may be adapted to determine when to store all available soft bit values and when to store only a subset of them. The control unit 240a may also be adapted to determine the size of such a subset and/or which soft bit values are to be included in the subset (compare steps 140a, 141a, 142a in FIG. 1A). The control unit may also receives the soft bit values for storing (either the received soft bit values for each transmission/retransmission as discussed above or the soft bit values input to the FEC decoder as illustrated in FIG. 2A). In other embodiments, the soft bit values are not relayed via the control unit, but are directly input to the memory.

The control unit 240a may be a dedicated HARQ buffer control unit or it may also perform other control tasks. Likewise, the memory 250a may be dedicated as HARQ buffer only, or it may also have other memory functions.

If the signal received by the arrangement 200a is retransmission of a packet of a HARQ scheme, the received signal is input to the combiner 260a, where it is combined with the soft bit values of the packet that was stored in memory 250a (compare with steps 170a, 171a, 172a in FIG. 1A). Combiner 260a may use any suitable combining method, for example soft combining.

The switch 231a is set to its lower position and thus, the output of the combiner 260a is then input to the FEC decoder 232a, where another attempt to decode the packet is made.

Figure 2B:
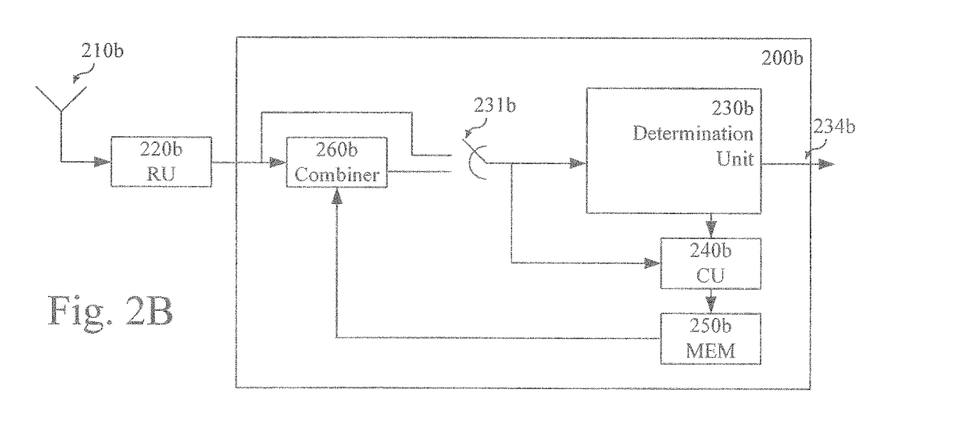

FIG. 2B illustrates an example arrangement 200b according to some embodiments of the invention. The arrangement 200b comprises a combiner 260b, a switch 231b, a determination unit 230b, a control unit (CU) 240b, and a memory (MEM) 250b. The arrangement 200b may, for example, be adapted to perform method steps as described in connection to FIG. 1B.

In FIG. 2B, the arrangement 200b is illustrated as incorporated into a receiver chain. The receiver chain comprises one or more antennas 210b and a receiving unit (RU) 220b, which may, for example, comprise conventional receiver front end circuitry. The receiving unit outputs a signal (e.g. a baseband signal), which is received by the arrangement 200b.

The operation of the arrangement 200b is similar to that of the arrangement 200a in FIG. 2A and is therefore not described in detail.

The arrangement 200b differs from the arrangement 200a in that the decoder 230a of arrangement 200a is replaced by the switch 231b and the determination unit 230b. The operation of the determination unit 230b comprises determining whether or not the soft bit values under consideration (received or output from the combiner) meets a stop criterion, i.e. if they fulfill the requirements set for the signal to be output at 234b (compare with step 130b of FIG. 1B).

To further illustrate the advantages with some embodiments of the invention, an example concerning UMTS LTE will be presented in the following. In this example, a receiver receives soft values for a packet, where the packet has P payload bits. The number of bits in the packet after encoding is denoted N=P/R, where R=⅓ is the code rate of the FEC code (a systematic turbo code in UMTS LTE). The number of actually transmitted bits M may be equal to N or less than N depending on the rate matching. In some embodiments, M may also be greater than N (e.g. if an employed rate matching scheme is adapted to achieve a rate lower than R). In embodiments where the combining scheme performs soft combining of repeated values, it may be sufficient to only store up to N values even if M is greater than N. P, N and M depend on the transport format used at the moment. If the decoding of a packet fails in this system, K soft bit values are stored in the HARQ buffer and subsequently combined with soft bit values of the next retransmission of the packet. The number K is limited by $0<K\leq\min\{M, N\}\leq\max\{M, N\}$.

Thus, without using embodiments of the invention (K=min{M,N}), the worst case scenario (for which the HARQ buffer would have to be designed) requires memory space for saving $3P_{wc}$ soft bit values for each active HARQ process (up to 9 simultaneous HARQ processes should be supported for UMTS LTE in TDD and up to 8 in FDD), where the worst case packet size $P=P_{wc}$ depends on which transport formats are supported by the receiver. The UE category specifies which transport formats must be supported, which in turn translates to $P_{wc}$ (for example, for a category 3 UE: $P_{wc}$=75376 for single stream and $P_{wc1}+P_{wc2} \leq 102048$ for double stream, see specification 3GPP TS 36.306, Table 4.1-1).

However, there is no requirement in the UMTS LTE specification regarding the number of bits per soft bit value (i.e. the resolution of the soft bit values). This latter fact may be used to reduce the required HARQ buffer size by lowering the resolution of the soft by values before storing in some or al situations.

On the other hand, if embodiments of the invention are applied to this system, the HARQ buffer size may be reduced. For example, in a worst case situation (e.g. when the maximum number of simultaneous HARQ processes are active, when $P=P_{wc}$, and the memory fill ratio approaches 100%) only the systematic bits may be stored after a failed decoding (K=P=N/3). This the HARQ buffer size can be reduced to one third compared with a system without using embodiments of the invention.

In the general case, the HARQ buffer size can be reduced by (1-R) if only the systematic bits are stored. Storing only the systematic bits has the advantage that no processing overhead is required in either hardware or software to implement this embodiment.

Figure 3:
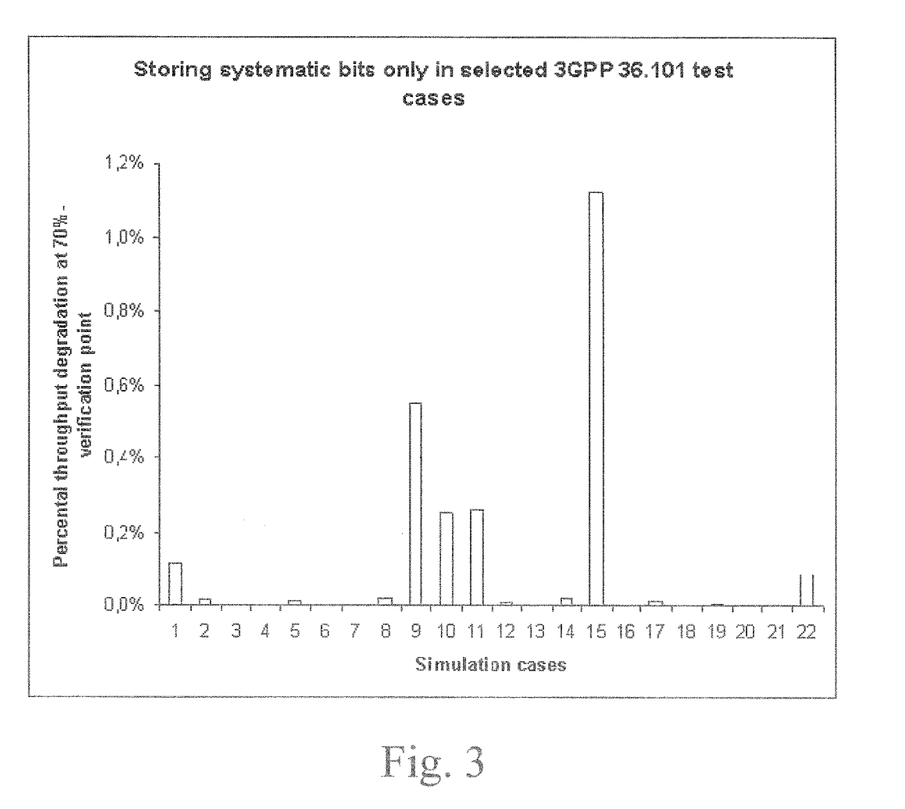
FIG. 3 is a plot illustrating example results achieved when applying some embodiments of the invention.

FIG. 3 illustrates results achieved when applying an embodiment similar to the one described above, where K=P (only systematic bits stored) for all situations. The simulation cases comprise a set of 3GPP 36.101 test cases where the test point is set to 70% throughput, i.e. a BLER of approximately 30%. It may be observed that the throughput degradation due to saving only a subset of the oft bit values is very small (even none for some test cases). This minor degradation may be considered a small cost compared to the advantage of reducing the HARQ memory size with ⅔.

In some embodiments only the systematic bits are stored (K=P) when the maximum designed system bit rate can be received (e.g. good channel conditions and maximum system bandwidth used in UMTS LTE), and to store more than the systematic bits (K>P) when the system configuration is such that the maximum designed system bit rate cannot be received (e.g. a more narrow system bandwidth used in UMTS LTE). Such an approach provides a possibility to reduce the HARQ memory size, while still providing full performance for most system configurations. In some embodiments, K may be increased gradually, e.g. in relation to the bit rate, the system bandwidth, or other relevant parameters.

In general, the determination of K (and of which soft bit values are to be subset members, i.e. included in the subset) may be based on one or more of a number of suitable parameters as has been mentioned before. Such parameters include, but are not limited to: an operating point or a target value of SNR (signal-to-noise ratio) or BLER, an expected BLER, a system configuration (for example the system bandwidth in UMTS LTE, or a maximum possible system bit rate), a current packet transmission mode (e.g. current transport format), and/or a HARQ memory status (e.g. a memory fill ratio, a HARQ buffer size, or an available HARQ buffer size). Simulations may provide a helpful tool in selecting suitable parameters and their relation to K and/or the subset members.

The following scenario illustrates one possibility to base the selection of K on various parameters in UMTS LTE. Consider receiving a first plurality of soft bit vales linked to a first packet transmission.

If the instantaneous expected BLER (which can be predicted, e.g. using an internal measure of SNR and the modulation-coding scheme at hand) is above a predefined BLER threshold and the HARQ memory buffer status is relaxed (e.g. low to medium memory fill ratio), then soft bit values to be stored may comprise both systematic and parity soft bit values (e.g. all available soft bit values, K=M, or a subset thereof including parity bits, P<K<M).

If the CQI (Channel Quality Indication) loop between UE and eNodeB is functional, a BLER of around 10% for an initial packet transmission is targeted. In such a case, the soft bit values to be stored could consist of only the systematic soft bit values, K=M.

The above mapping principles may also apply to subsequent retransmissions of the same packet. For retransmissions, however, the accumulated expected BLER (achieved through HARQ combining gain) should be taken into account. That is the expected BLER is based on present and previous transmissions linked to this packet.

If tight restrictions are enforced in the HARQ memory buffer design, this could imply tighter restrictions of how many soft bit values should be stored for a packet in different situations. For example, the BLER threshold referred to above may vary depending on the restrictions in HARQ buffer size. Additionally or alternatively, the BLER threshold may be dynamically changed depending on the current memory fill ratio, such that the threshold is set higher when the HARQ memory buffer status approaches a critical fill status.

The determination of K (and/or of which soft bit values are to be subset members, i.e. included in the subset) may be performed for each packet (e.g. in connection with the initial transmission of the packet), for each retransmission of the packet, or for some of the retransmissions of the packet. In some embodiments, the determination is made more rarely, e.g. at some predetermined regular time intervals or when a change occurs that supposedly affects the operation of the HARQ system (e.g. a transmission format change, a system bandwidth change, or a cell handover).

Figure 4:
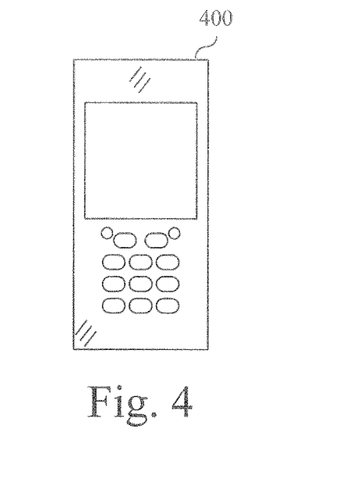
FIG. 4 is a schematic drawing illustrating a mobile terminal connected, through a radio link, to a base station site, wherein the mobile terminal may comprise an arrangement according to some embodiments of the invention.

FIG. 4 illustrates an example mobile terminal 400. The mobile terminal 400 may be connected, through a radio link, to a base station site. The mobile terminal may comprise a HARQ arrangement according to embodiments of the invention. The mobile terminal 400 may, for example, comprise an arrangement as described in connection to any of FIGS. 2A and 2B.

The example mobile terminal 400 is adapted to connect to a mobile telecommunication network via the wireless link to the radio base station. Hence, a user of the mobile terminal may use conventional circuit-switched telecommunication services such as voice calls, data calls, video calls, and fax transmissions, and/or packet-based services such as electronic messaging, VoIP, Internet browsing, electronic commerce, etc. To this end, the mobile terminal 400 and the base station may be compliant with at least one mobile telecommunication standard, for instance UMTS and/or UMTS LTE.

It is to be understood that, although the described embodiments of the invention have focused on UMTS (employing HARQ on WCDMA signals) and UMTS LTE (employing HARQ on OFDM signals), embodiments of the invention are equally applicable in any system employing HARQ.

The described embodiments of the invention and their equivalents may be realised in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of the invention.

The invention may be embodied within an electronic apparatus comprising circuitry/logic or performing methods according to any of the embodiments of the invention. The electronic apparatus may, for example, be a portable or handheld mobile radio communication equipment, a mobile radio terminal, a mobile telephone, a base station, a communicator, an electronic organizer, a smartphone, a computer, a notebook, an embedded drive, a mobile gaming device, or a (wrist) watch.

According to some embodiments of the invention, a computer program product comprises a computer readable medium such as, for example, a diskette, a USB-stick or a CD-ROM. The computer readable medium may have stored thereon a computer program comprising program instructions. The computer program may be loadable into a data-processing unit, which may, for example, be comprised in a mobile terminal. When loaded into the data-processing unit, the computer program may be stored in a memory associated with or integral to the data-processing unit. According to some embodiments, the computer program may, when loaded into and run by the data-processing unit, cause the data-processing unit to execute method steps according to, for example, any of the methods shown in any of the FIGS. 1A and 1B.

The invention has been described herein with reference to various embodiments. However, a person skilled in the art would recognize numerous variations to the described embodiments that would still fall within the scope of the claimed invention. For example, the method embodiments described herein describes example methods through method steps being performed in a certain order. However, it is recognized that these sequences of events may take place in another order without departing from the scope of the invention. Furthermore, some method steps may be performed in parallel even though they have been described as being performed in sequence.

In the same manner, it should be noted that in the description of embodiments of the invention, the partition of functional blocks into particular units is by no means limiting to the invention. Contrarily, these partitions are merely examples. Functional blocks described herein as one unit may be split into two or more units. In the same manner, functional blocks that are described herein as being implemented as two or more units may be implemented as a single unit without departing from the scope of the invention.

Hence, it should be understood that the limitations of the described embodiments are merely for illustrative purpose and by no means limiting. Instead, the scope of the invention is defined by the appended claims.

The invention claimed is:

1. A method for an electronic receiver of processing a packet of a hybrid automatic repeat request (HARQ) system, comprising:
   receiving a first transmission of the packet, wherein the first transmission comprises a first plurality of soft symbol values, said first plurality of soft symbol values consisting of N soft symbol values, wherein N>1;
   determining whether the first plurality of soft symbol values meets a stop criterion; and
   in response to determining that the first plurality of soft symbol values does not meet the stop criterion:
   determining a subset of the first plurality of soft symbol values, wherein the subset comprises a number of soft symbol values of the first plurality of soft symbol values, the number being greater than zero and less than N;
   storing the subset of the first plurality of soft symbol values in a HARQ buffer;
   receiving a second transmission of the packet, wherein the second transmission comprises a second plurality of soft symbol values; and
   combining the second plurality of soft symbol values with the stored subset of the first plurality of soft symbol values to produce a third plurality of combined soft symbol values.

2. The method of claim 1, wherein the first transmission is an initial transmission of the packet and the second transmission is a re-transmission of the packet.

3. The method of claim 1, wherein the first transmission is a first re-transmission of the packet and the second transmission is a second re-transmission of the packet.

4. The method of claim 1, wherein
   the method further comprises decoding the packet based on a first error correcting code and the first plurality of soft symbol values after the step of receiving the first transmission of the packet, and
   the step of determining whether the first plurality of soft symbol values meets a stop criterion comprises determining whether the step of decoding the packet based on the first plurality of soft symbol values was successful based on a first error detecting code, wherein it is determined that the first plurality of soft symbol values does not meet the stop criterion if it is determined that the step of decoding the packet based on the first plurality of soft symbol values was not successful.

5. The method of claim 4, wherein the error correcting code is a systematic error correcting code and the subset of the first plurality of soft symbol values comprises all soft symbol values corresponding to systematic symbols of the systematic error correcting code.

6. The method of claim 5, wherein the subset of the first plurality of soft symbol values consists of all soft symbol values corresponding to systematic symbols of the systematic error correcting code.

7. The method of claim 4, wherein the error detecting code comprises a check sum.

8. The method of claim 1, wherein the step of combining the second plurality of soft symbol values with the stored subset of the first plurality of soft symbol values comprises:
   substituting soft symbol values belonging to the first plurality of soft symbol values and not belonging to the subset of the first plurality of soft symbol values with a soft symbol value corresponding to a log likelihood ratio of zero; and
   combining the second plurality of soft symbol values with the stored subset of the first plurality of soft symbol values and the substituted soft symbol values corresponding to a log likelihood ratio of zero to produce the third plurality of combined soft symbol values.

9. The method of claim 1, wherein the step of determining the subset of the first plurality of soft symbol values is performed dynamically at moments in time corresponding to one or more of:
- a first transmission of each of a plurality of packets of the HARQ system;
- a retransmission of each of the plurality of packets of the HARQ system;
- regular time intervals;
- a change of packet transmission format; and
- a change in system bandwidth.

10. The method of claim 1, wherein the determination of the subset of the first plurality of soft symbol values is based on one or more of:
- a target signal-to-noise ratio operating point;
- a target block error rate operating point;
- an available HARQ buffer size;
- a current memory fill status;
- a current system bandwidth;
- a current packet transmission mode; and
- a maximum possible system bit rate.

11. The method of claim 1, further comprising:
determining whether the third plurality of soft symbol values meets the stop criterion; and
in response to determining that the third plurality of soft symbol values does not meet the stop criterion:
determining a second subset of the third plurality of combined soft symbol values, wherein the second subset comprises a second number of soft symbol values of the third plurality of combined soft symbol values, the second number being greater than zero and less than the third plurality;
storing the second subset of the third plurality of combined soft symbol values in the HARQ buffer;
receiving a third transmission of the packet, wherein the third transmission comprises a fourth plurality of soft symbol values; and
combining the fourth plurality of soft symbol values with the stored second subset of the third plurality of combined soft symbol values to produce a fifth plurality of combined soft symbol values.

12. A computer program apparatus comprising a non-transitory computer readable medium storing a computer program comprising program instructions, the computer program being loadable into a data-processing unit of an electronic receiver and adapted to cause the data-processing unit to execute at least the following steps for processing of a packet of a hybrid automatic repeat request (HARQ) system when the computer program is run by the data-processing unit:
determining whether a first plurality of soft symbol values, comprised in a first transmission of the packet received by the electronic receiver, meets a stop criterion, said first plurality of soft symbol values consisting of N soft symbol values, wherein N>1; and
as a result of determining that the first plurality of soft symbol values does not meet the stop criterion:
determining a subset of the first plurality of soft symbol values, wherein the subset comprises a number of soft symbol values of the first plurality of soft symbol values, the number being greater than zero and less than N;
storing the subset of the first plurality of soft symbol values in a HARQ buffer; and
combining a second plurality of soft symbol values, comprised in a second transmission of the packet received by the electronic receiver, with the stored subset of the first plurality of soft symbol values to produce a third plurality of combined soft symbol values.

13. An apparatus for an electronic receiver, adapted to process a packet of a hybrid automatic repeat request (HARQ) system, comprising:
- a determination unit;
- a combiner;
- a memory unit; and
- a HARQ buffer control unit, wherein
the determination unit is adapted to determine whether a plurality of soft symbol values, comprised in a first transmission of the packet received by the electronic receiver, meets a stop criterion, said first plurality of soft symbol values consisting of N soft symbol values, wherein N>1;
the HARQ buffer control unit is adapted to determine a subset of the first plurality of soft symbol values in response to a determination by the determination unit that the first plurality of soft symbol values does not meet the stop criterion, wherein the subset comprises a number of soft symbol values of the first plurality of soft symbol values, the number being greater than zero and less than N;
the memory unit is adapted to store the subset of the first plurality of soft symbol values in a HARQ buffer; and
the combiner is adapted to combine a second plurality of soft symbol values, comprised in a second transmission of the packet received by the electronic receiver, with the stored subset of the first plurality of soft symbol values to produce a third plurality of combined soft symbol values.

14. The apparatus of claim 13, wherein the apparatus further comprises a decoder adapted to:
decode the packet based on a first error correcting code and the first plurality of soft symbol values; and
determine whether decoding the packet based on the first plurality of soft symbol values was successful based on a first error detecting code, whereby it is determined that the first plurality of soft symbol values does not meet the stop criterion if it is determined that decoding the packet based on the first plurality of soft symbol values was not successful.

15. The apparatus of claim 13, wherein the combiner is further adapted to:
substitute soft symbol values belonging to the first plurality of soft symbol values and not belonging to the subset of the first plurality of soft symbol values with a soft symbol value corresponding to a log likelihood ratio of zero; and
combine the second plurality of soft symbol values with the stored subset of the first plurality of soft symbol values and the substituted soft symbol values corresponding to a log likelihood ratio of zero to produce the third plurality of combined soft symbol values.

16. The apparatus of claim 13, wherein the HARQ buffer control unit is adapted to determine the subset of the first plurality of soft symbol values dynamically at moments in time corresponding to one or more of:
- a first transmission of each of a plurality of packets of the HARQ system;
- a retransmission of each of the plurality of packets of the HARQ system;
- regular time intervals;
- a change of packet transmission format; and
- a change in system bandwidth.

17. The apparatus of claim 13, wherein the HARQ buffer control unit is adapted to determine the subset of the first plurality of soft symbol values based on one or more of:
   a target signal-to-noise ratio operating point;
   a target block error rate operating point;
   an available HARQ buffer size;
   a current memory fill status;
   a current system bandwidth;
   a current packet transmission mode; and
   a maximum possible system bit rate.

18. The apparatus of claim 13, further comprising a receiving unit adapted to receive the first and second transmissions of the packet.

19. The apparatus of claim 13, wherein the packet is comprised in at least one of:
   a Wideband Code Division Multiple Access (WCDMA) signal; and
   an Orthogonal Frequency Division Multiplexing (OFDM) signal.

20. An electronic receiver comprising the apparatus of claim 13.

21. A communication device comprising the receiver according to claim 20.

22. The communication device of claim 21, wherein the communication device is compliant with at least one of:
   a Universal Mobile Telecommunication Standard (UMTS) standard; and
   an UMTS Long Term Evolution (UMTS LTE) standard.

* * * * *